US005910049A

United States Patent [19]
DeWachter et al.

[11] Patent Number: 5,910,049
[45] Date of Patent: Jun. 8, 1999

[54] ELASTOMERIC COUPLING SYSTEM

[75] Inventors: Gary E. DeWachter, Simpsonville; Donald L. Nisley, Greenville; Suresh S. Tirumalai, Simpsonville, all of S.C.

[73] Assignee: Reliance Electric Industrial Company, Cleveland, Ohio

[21] Appl. No.: 08/937,970

[22] Filed: Sep. 25, 1997

[51] Int. Cl.[6] .................................................... F16D 3/58
[52] U.S. Cl. ............................................................. 464/80
[58] Field of Search .................................. 464/79, 80, 88

[56] References Cited

U.S. PATENT DOCUMENTS

| 3,178,906 | 4/1965 | Ricketts | 464/80 |
| 3,434,303 | 3/1969 | Leyer | 464/74 |
| 3,531,949 | 10/1970 | Downey | 464/80 |
| 3,605,440 | 9/1971 | Firth | 464/80 |
| 5,611,732 | 3/1997 | Tirumalai | 464/80 |

FOREIGN PATENT DOCUMENTS

| 189646 | 11/1966 | U.S.S.R. | 464/80 |
| 214967 | 3/1968 | U.S.S.R. | 464/79 |

OTHER PUBLICATIONS

Brochure, "Omega Couplings", by Rexnord, Aug. 1992, Wisconsin, pp. E2–E19.

*Primary Examiner*—Eileen Dunn Lillis
*Attorney, Agent, or Firm*—Patrick S. Yoder; John M. Miller; John J. Horn

[57] ABSTRACT

An elastomeric coupling system for securing axially aligned driving and driven shafts includes a pair of hubs coupled to one another by an annular flexible coupling element. The hubs are fixed to respective driving and driven shafts, and the coupling element is then secured between the hubs by anchoring assemblies. Each anchoring assembly includes anchoring members which are fixed to respective hubs by fasteners received in the hubs. The fasteners are oriented generally transverse to the aligned axes of the shafts, providing ready access for installation and servicing. As the anchoring members are secured about the hubs, axial and radial loads are exerted on peripheral beads of the coupling element to produce retaining forces sufficient to withstand considerable torsional loading during use.

26 Claims, 6 Drawing Sheets

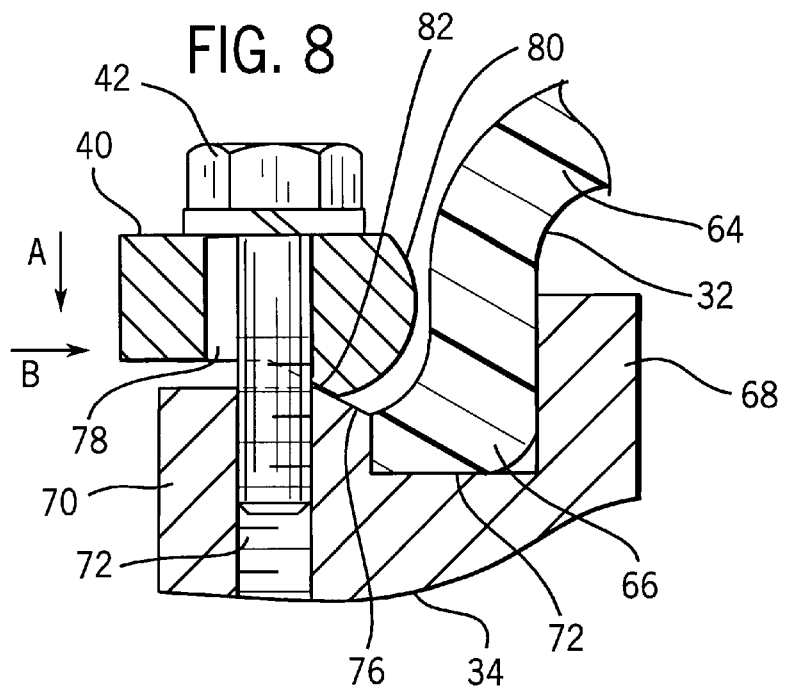
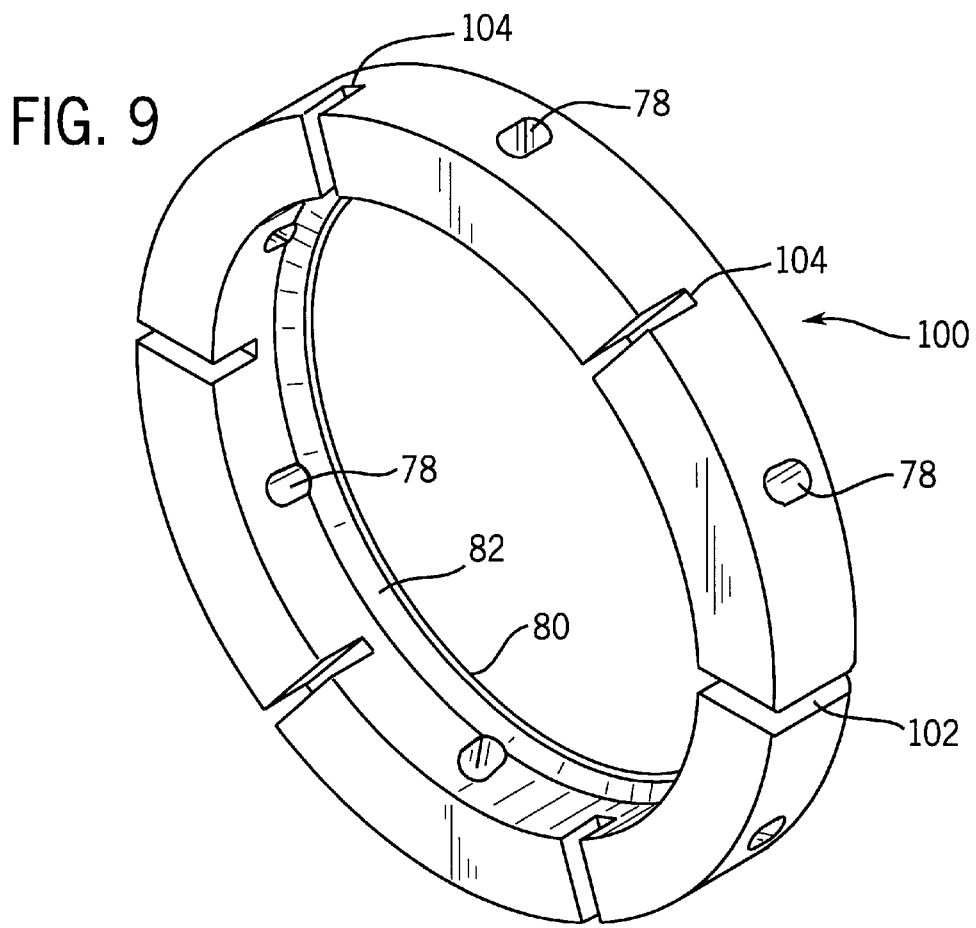

5,910,049

ELASTOMERIC COUPLING SYSTEM

BACKGROUND OF THE INVENTION

1. Field of the Invention

The present invention relates generally to coupling systems for transmitting mechanical power between a motor or other prime mover and a driven machine. More particularly, the invention relates to a elastomeric coupling system permitting a certain degree of misalignment between driving and driven shafts, which is easy to install and which provides enhanced retaining forces for an elastomeric element disposed between the shafts.

2. Description of the Related Art

A great number of applications exist for rotating machinery including a prime mover or driver coupled to a driven piece of machinery. In many industrial and other applications, such prime movers include electric motors, hydraulic motors, pneumatic motors, internal combustion engines and so forth. These prime movers are commonly used to drive pumps, conveyers, agitators, fans, as well as a great variety of other machines.

In general, such systems may transmit power from the prime mover to the driven shaft in a variety of ways. For example, direct couplings may be interposed between the shafts, aligning the shafts axially with one another for direct transmission of rotary motion. Historically, fairly rigid couplings required that the shafts be carefully aligned with one another in order to reduce cyclic loading on both the coupling and the shafts, and on bearing sets supporting the shafts. More modem systems include various types of flexible couplings, generally including elastomeric elements interposed between coupling hardware, which permit some degree of misalignment between the shafts, while effectively transmitting power therebetween. Such flexible couplings also provide some degree of cushioning of torque spikes, and facilitate coupling and uncoupling of the prime mover with the driven shaft.

Various forms of flexible couplings have been proposed and are commercially available. In one known arrangement a tire-like flexible element is interposed between attachment structures supported on each shaft. The attachment structures include a hub or bushing which is secured to the shaft, such as by means of a conventional key or tapered locking bushing arrangement. The hub supports a flanged attachment structure including a peripheral flange that extends in a plane perpendicular to the axis of the shaft. The elastomeric element is annular in shape and is split transversely to allow it to be opened and slipped over a gap between the attachment structures. The elastomeric element includes a peripheral bead on either side which is inserted between each support flange and a retaining flange aligned in axially facing relation to each support flange. The retaining flanges are then tightly secured to the attachment flanges by means of axially-extending bolts. As the entire structure is drawn together, the bead on either side of the elastomeric element is compressed in a direction parallel to the axis of the shafts, producing a retention force between the flanges and the elastomeric element. The retention force, in combination with the coefficient of friction between the elastomeric element and its mounting structures affords an excellent torque-carrying capacity to the coupling assembly. Couplings of this type are commercially available from the Dodge Division of Reliance Electric Industrial Company, under the commercial designation Paraflex.

While such couplings provide excellent performance and conveniently permit some degree of misalignment between the driving and driven shafts, they are not without certain drawbacks. For example, couplings of the type described above may be somewhat difficult to assemble depending upon spacing between the prime mover and the driven machine. In particular, clearances of axially-aligned bolts may be fairly short where the machines are placed close to one another, making the bolts difficult to insert and tighten into their corresponding threaded bores in the coupling flanges. In addition, in certain larger sizes of these couplings the elastomeric power transmission element may be difficult to place between the flanged mounting structures, particularly where clearances between the machines limit the distance the attachment and retaining flanges can be spaced from one another.

Other, somewhat similar flexible coupling arrangements have been proposed and are commercially available. In another known design coupling halves are mountable to hubs by means of radially-extending bolts. Each coupling half includes a molded elastomeric element which extends slightly less than 180° around the axially aligned shafts. Semicircular metallic flanges are bonded to the elastomeric elements and extend in a direction generally parallel to the axis of the shafts. The coupling is installed by securing support hubs on each shaft and then bolting two mutually facing elastomeric element and flange assemblies on either side of the hubs. While the resulting structure is relatively easy to assemble, misalignment between the shafts can result in deformation of the metallic flanges and difficulty in inserting retaining bolts into hubs. Additionally, the entire torque-carrying capacity of the resulting coupling depends upon the integrity of bonds formed between the elastomeric elements and the attachment flanges. Even partial rupture of either the elastomeric elements or the bonds can result in tearing of the elements under stress or, in certain cases, complete detachment of the elastomeric elements from the attachment flanges.

There is a need, therefore, for an improved flexible coupling system which avoids the drawbacks of prior art systems. In particular, there is a need for a system which is both extremely rugged and easy to install, even in applications where spacing between driving and driven components is relatively restricted. Moreover, there is a need for an improved flexible coupling system which transmits torque and power by means of substantial holding forces between system components, and particularly between an elastomeric element and mechanical hardware associated with the driving and driven shafts.

SUMMARY OF THE INVENTION

The invention provides an innovative flexible coupling system designed to respond to these needs. The coupling system utilizes an elastomeric composition element positioned between mounting structures which are supported on the driving and driven shafts. Torque is transmitted via the intermediary of the elastomeric composition element. The element is supported on the attachment structures, which exert both radial and axial forces on beads formed on the element. The attachment structures include hubs with an integrally-formed interface for receiving the beads of the elastomeric composition element. Anchoring elements are disposed about the interface and compress the elastomeric element during installation and use. Fasteners for securing the anchoring elements to the hubs are inserted in a radial direction, generally transverse to the axis of the shafts, facilitating assembly and disassembly of the structure.

Thus, in accordance with the first aspect of the invention, a system is provided for securing first and second generally axially-aligned shafts drivingly to one another. The system includes a first hub, a second hub, a flexible coupling element, and first and second anchoring assemblies. The first hub has a central axis and is configured for mounting on the first shaft. The first hub has a plurality of bores extending generally radially transverse to its central axis. The second hub also has a central axis and is configured for mounting to the second shaft. The second hub similarly has a plurality of bores extending generally radially transverse to its central axis. The anchoring assemblies each include at least one anchoring element in a plurality of fasteners. The fasteners are received in the bores of each hub to secure the anchoring elements to a respective hub and to compressively secure first and second sides of the coupling element between the anchoring elements and the hubs.

In accordance with another aspect of the invention, a system for coupling axially aligned shafts includes first and second hubs, a flexible coupling element, and first and second anchoring assemblies. The hubs have generally coaxially aligned central axes and are configured for mounting on the first and the second shafts, respectively. The first and second anchoring assemblies each include at least one anchoring element and means for securing the anchoring element to a respective hub. The anchoring elements compress sides of the flexible coupling element both axially and radially as they are secured to the hubs. In a particularly preferred embodiment, the hubs include guide surfaces that contact the anchoring elements to guide the anchoring elements into positions wherein the anchoring elements compress sides of the flexible coupling element.

In accordance with a further aspect of the invention, an assembly is provided for securing a generally annular flexible coupling element to a shaft. The coupling element includes an enlarged region formed along an inner peripheral edge thereof. The assembly includes a hub and at least one anchoring element configured to interface with the hub. The hub has a central axis and is configured for mounting on the shaft. The hub includes a peripheral recess for receiving the enlarged region of the coupling element. The anchoring element cooperates with the hub to retain the enlarged region of the coupling element within the recess. Means is provided for securing the at least one anchoring element to the hub. In a preferred configuration, the anchoring element includes a plurality of arcuate elements configured to partially circumscribe the hub. Fasteners received within bores in the hub extend generally radially transverse to the central axis of the hub.

BRIEF DESCRIPTION OF THE DRAWINGS

The foregoing and other features of the invention will become apparent upon reading the following detailed description and upon reference to the drawings in which:

FIG. 8 is a detail view of the components illustrated in FIG. 5 during assembly;

FIG. 9 is a perspective view of an alternative configuration of an anchoring member for use in the coupling system illustrated in FIGS. 1 through 4;

DETAILED DESCRIPTION OF SPECIFIC EMBODIMENTS

Figure 1:
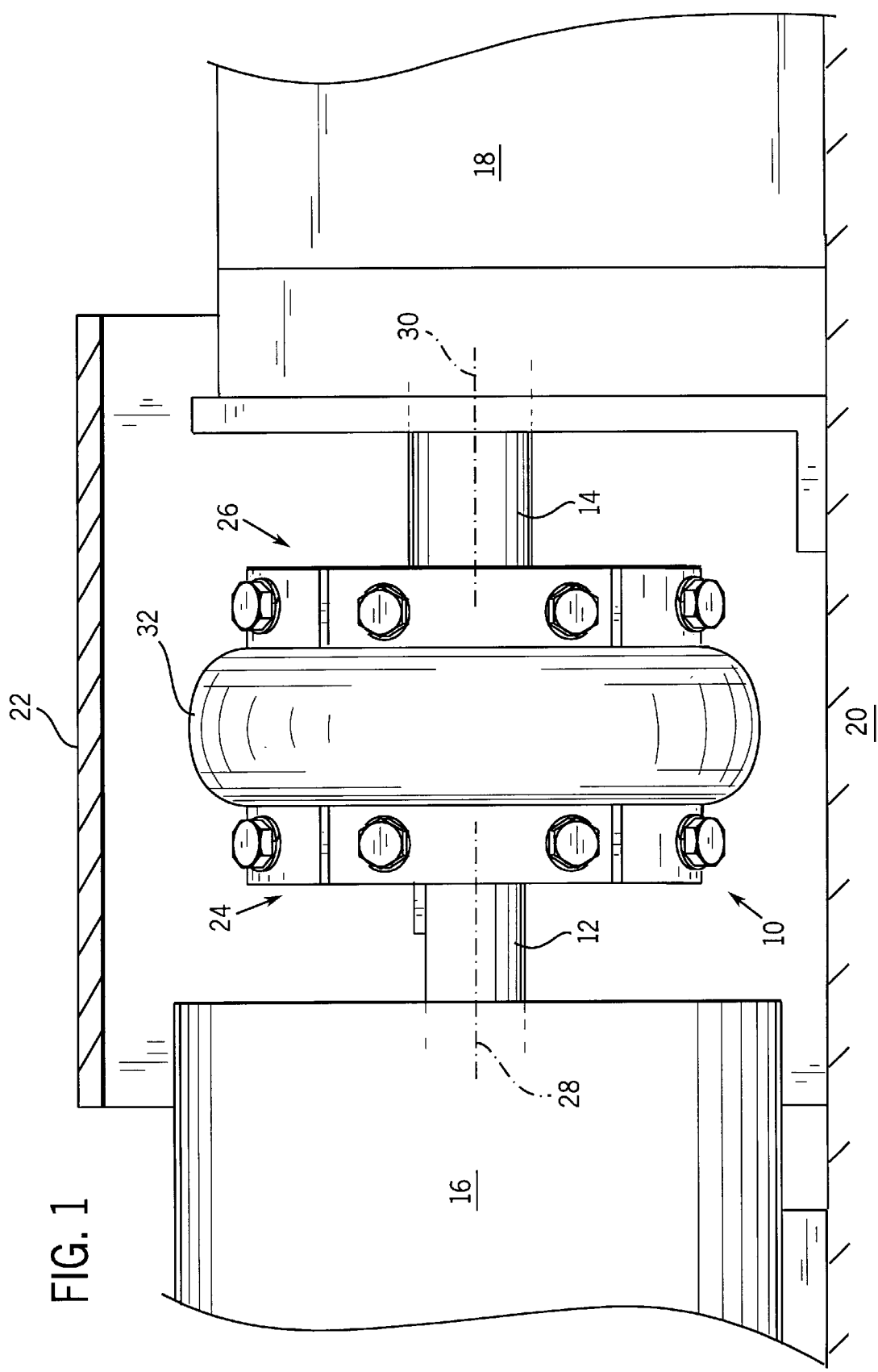
FIG. 1 is a side elevational view of an electric motor coupled to a driven machine, such as a pump, by means of a coupling system in accordance with certain aspects of the present invention.

Turning now to the drawings, and referring first to FIG. 1, a coupling system, designated generally by the reference numeral 10, is illustrated for coupling a first shaft 12 to a second shaft 14. As illustrated in FIG. 1, shaft 12 is an output shaft from an electric motor 16. Shaft 14 is an input shaft of a driven machine 18, such as a foot-mounted pump. As shown in FIG. 1, motor 16 and pump 18 are mounted on a support base 20. Motor 16 and pump 18 are spaced sufficiently from one another to permit installation of coupling system 10 on shafts 12 and 14. The space between motor 16 and pump 18 and the assembled coupling system are preferably covered by a suitable guard or shroud 22 in a conventional manner.

In general, system 10 includes a first hub assembly 24 mounted on shaft 12, and a second hub assembly 26 mounted on shaft 14 such that both hub assemblies are coaxial with one another, along axes 28 and 30 of motor 16 and pump 18, respectively. A flexible, composite coupling element 32 is secured to hub assemblies 24 and 26 in a manner more fully described below. Coupling element 32 is preferably a generally annular component made of a composite material comprising resilient rubber or plastic in which fibrous or textile reinforcing layers are embedded. Element 32 is split transversely to allow it to be opened and fitted over both hub assemblies for installation, as described below. In operation, power is transmitted from shaft 12 to shaft 14 by the intermediary of hub assemblies 24 and 26 and coupling element 32. Coupling element 32 permits some degree of misalignment between axes 28 and 30, while effectively transmitting torque between the shafts.

It should be noted that, while reference is made in the present discussion to a prime mover in the form of an electric motor and to a driven machine in the form of a pump, the coupling system described herein is not limited to application with any particular type of prime mover or driven machine. In particular, the coupling system can be applied to a wide range of input power sources, such as internal combustion engines, hydraulic motors, jack shafts coupled to upstream power sources, sprocket or chain drives and so forth. Similarly, coupling system 10 may be applied to any suitable driven element, such as conveyors, drive pulleys, fans, agitators, and so forth. Moreover, both the driving and driven elements to which coupling system 10 is applied may be rigidly mounted on a machine base as illustrated in the figures, or may be secured by any other suitable means, such as by support adapters, spacing adapters and the like. Finally, coupling system 10 may be applied to shafts 12 and 14 aligned in any desired orientation, including horizontally, vertically, and at various angles therebetween.

Figure 2:
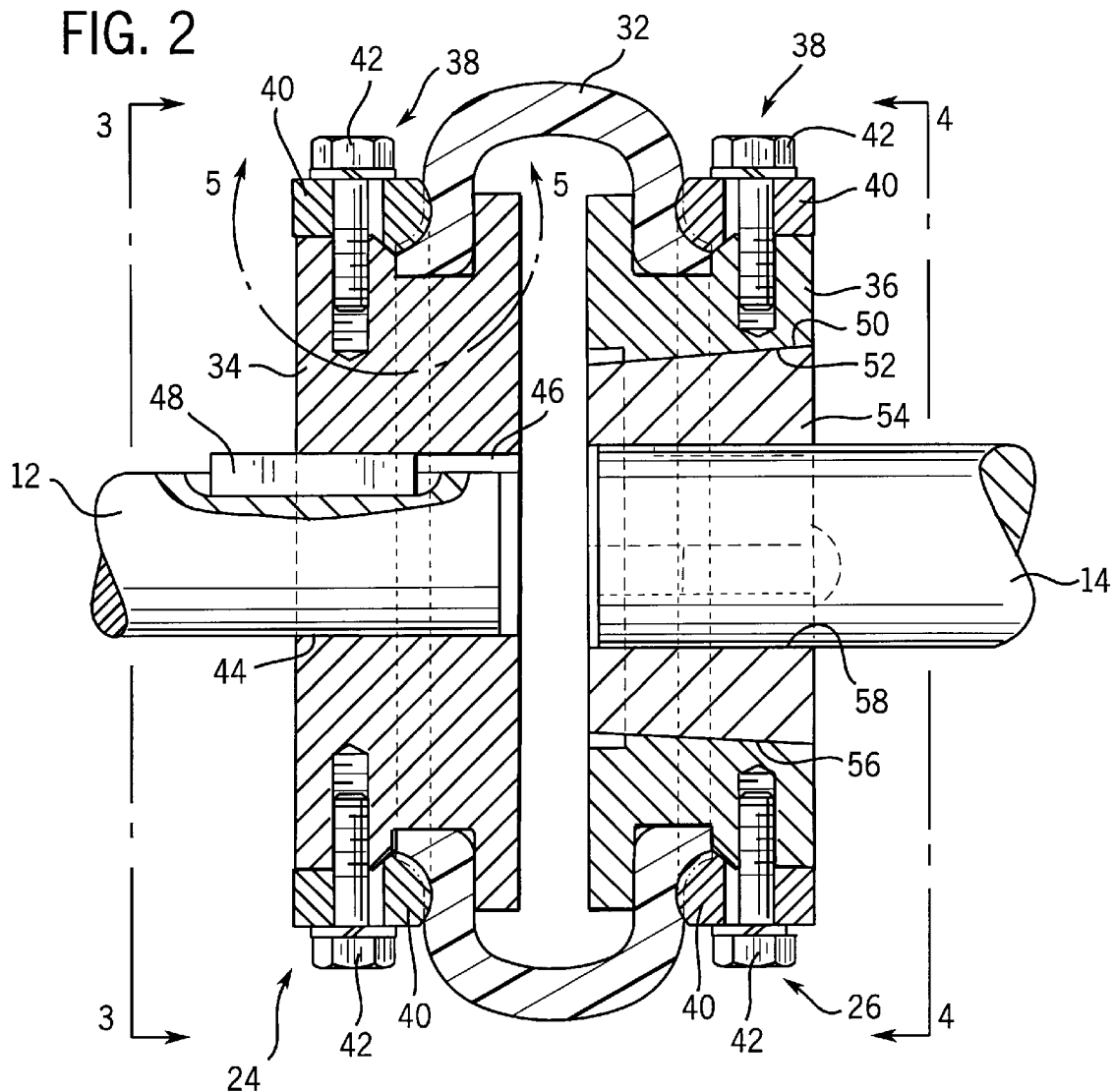
FIG. 2 is a sectional view through the coupling system illustrated in FIG. 1 along line 2—2.

Referring more specifically now to a preferred arrangement of coupling system 10, FIG. 2 illustrates the system shown in FIG. 1 in transverse section. As illustrated in FIG. 2, hub assemblies 24 and 26 may be secured to their respective shafts in several ways. For example, hub assembly 24 is shown secured to shaft 12 by means of a conventional keyway and key structure. Hub assembly 26 is secured to shaft 14 by a tapered bushing arrangement as described more fully below. Hub assemblies 24 and 26 each include hubs, 34 and 36, respectively, and anchoring assemblies 38 for securing coupling element 32 to both hubs. Each anchoring assembly 38 includes anchoring members 40 and fasteners 42 received through anchoring members 40 and into hubs 34 and 36. Anchoring members 40 cooperate with hubs 34 and 36 to exert both axial and radial compression forces on coupling element 32.

Figure 3:
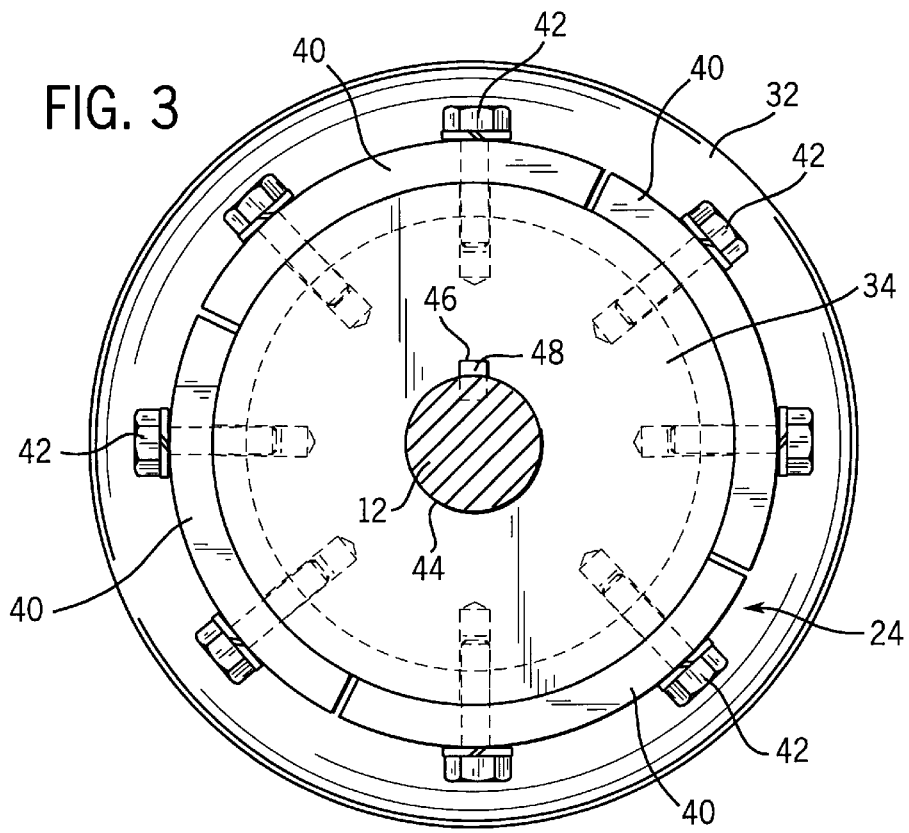
FIG. 3 is an end view of the coupling system illustrated in FIG. 2 sectioned through the electric motor shaft along line 3—3.
Figure 4:
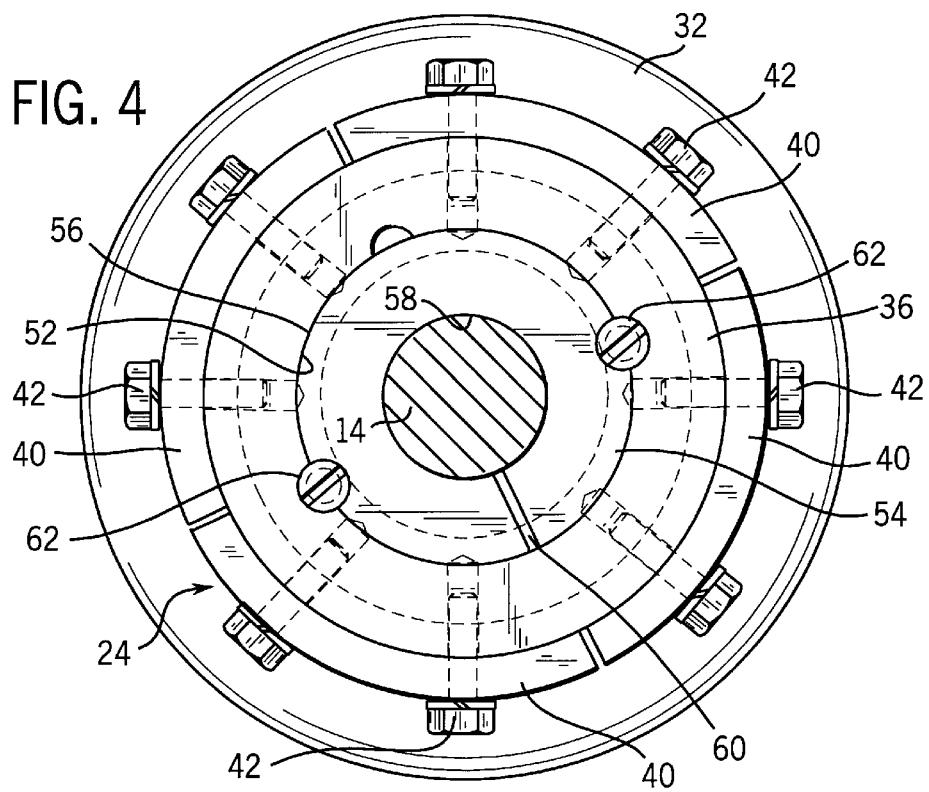
FIG. 4 is an end view of the coupling system illustrated in FIG. 2, sectioned through the driven machine shaft along line 4—4.

While any number of alternative configurations may be envisioned by those skilled in the art for securing hubs 34 and 36 to their respective shafts, FIGS. 2, 3 and 4 represent two presently preferred arrangements for securing these components within system 10. In particular, as shown in FIGS. 2 and 3, hub 34 includes a central aperture 44 in which a keyway 46 is cut. Shaft 12 is correspondingly formed as a conventional keyed shaft. A key 48 is fitted between shaft 12 and hub 34 for transmitting torque from shaft 12 to hub 34 in a conventional manner.

Hub 36, on the other hand, includes a central aperture 50 having a tapered inner surface 52. A tapered bushing 54 is inserted into central aperture 50 of hub 36 to lock hub 36 to shaft 14. In particular, tapered bushing 54 has a tapered outer surface 56 and a generally cylindrical central aperture 58. The angle of taper of outer surface 56 of bushing 54 corresponds to the angle of taper of inner surface 52 of hub 36 such that these elements contact and conform to one another during assembly. An elongated slit 60 is formed through the entire length of bushing 54 to permit its radial compression about shaft 14 when installed. Hub 36 and bushing 54 are drilled and tapped along a line of interface to receive fasteners 62 (see FIG. 4) for locking hub 36 and bushing 54 in tight engagement with one another during installation. Thus, hub 36 is installed on shaft 14 by positioning bushing 54 in desired location along shaft 14 and by subsequently tightening fasteners 62 to lock hub 36 and bushing 54 into engagement with one another and progressively to compress bushing 54 radially (narrowing slit 60) until bushing 54 is tightly secured about shaft 14.

Depending upon the configurations of the shafts on which coupling system 10 is to be installed, one or both of the systems described above, or various alternative systems, may be used in combination to support mutually facing hubs on the axially aligned shafts. Once the hubs have been secured to the shafts, coupling element 32 may be secured to the hubs as described below.

In the illustrated embodiment, anchoring assemblies 38 each include a plurality of anchoring members 40 extending around a portion of the circumference of hubs 34 and 36. In particular, four such anchoring members are provided, each secured to hubs 34 and 36 by a pair of fasteners 42 (see FIGS. 3 and 4). Each anchoring member 40 extends over slightly less than 90° of the circumference of a respective hub, leaving a space between each anchoring member to permit slight movement of the anchoring members toward one another during installation of coupling system 10.

Figure 5:
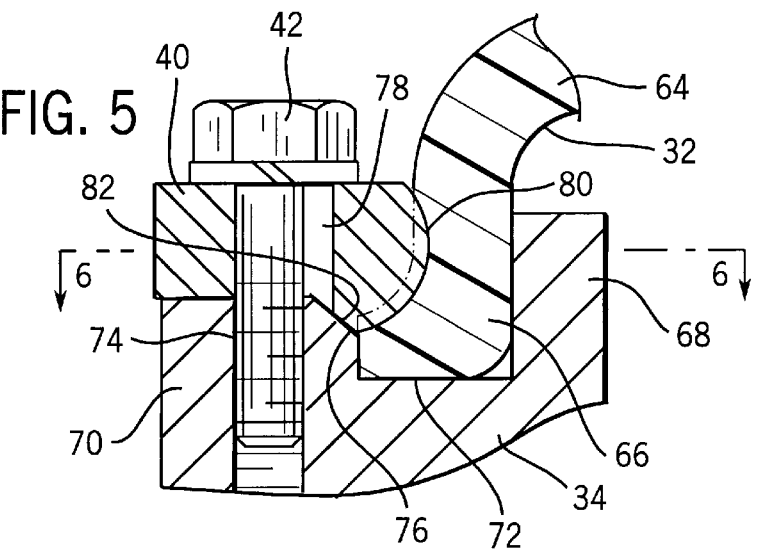
FIG. 5 is a detail view of a portion of the coupling system illustrated in FIG. 2 showing the cooperation of certain components of the system for retaining a flexible coupling element in compression.

As shown in FIG. 2, coupling element 32 has a central region 64 extending between a pair of integrally-formed beads 66 at its radially inward peripheral edges. As mentioned above, coupling element 32 is preferably formed as a split annular member, enabling it to be opened and placed into hubs 34 and 36. As best illustrated in FIG. 5, each hub includes an annular front flange 68 and an annular rear flange 70 spaced from one another to form an annular recess or groove 72. Threaded apertures 74 are formed in rear flange 70 in radially spaced locations (see FIGS. 3 and 4). In the preferred embodiment, threaded apertures 74 extend radially outwardly from and transverse to axes 28 and 30. An inclined guide surface 76 is formed along rear flange 70 bordering groove 72.

Figure 6:
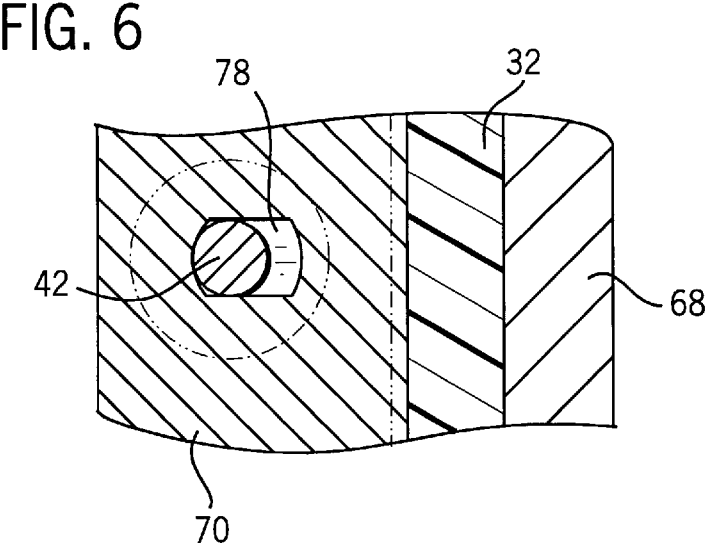
FIG. 6 is a sectional detail view of the arrangement illustrated in FIG. 5 along line 6—6 illustrating a preferred arrangement for permitting movement of certain components of the system during assembly.

As best shown in FIGS. 5 and 6, anchoring members 40 include radially spaced apertures 78 for receiving fasteners 42 during installation of system 10. In the preferred embodiment, apertures 78 are slotted to permit axial translation of anchoring members 40 during installation and removal of coupling element 32. Each anchoring member 40 further includes a compression ridge 80 (see FIG. 5) and an inclined riding surface 82 formed along a lower edge of compression ridge 80.

Figure 7:
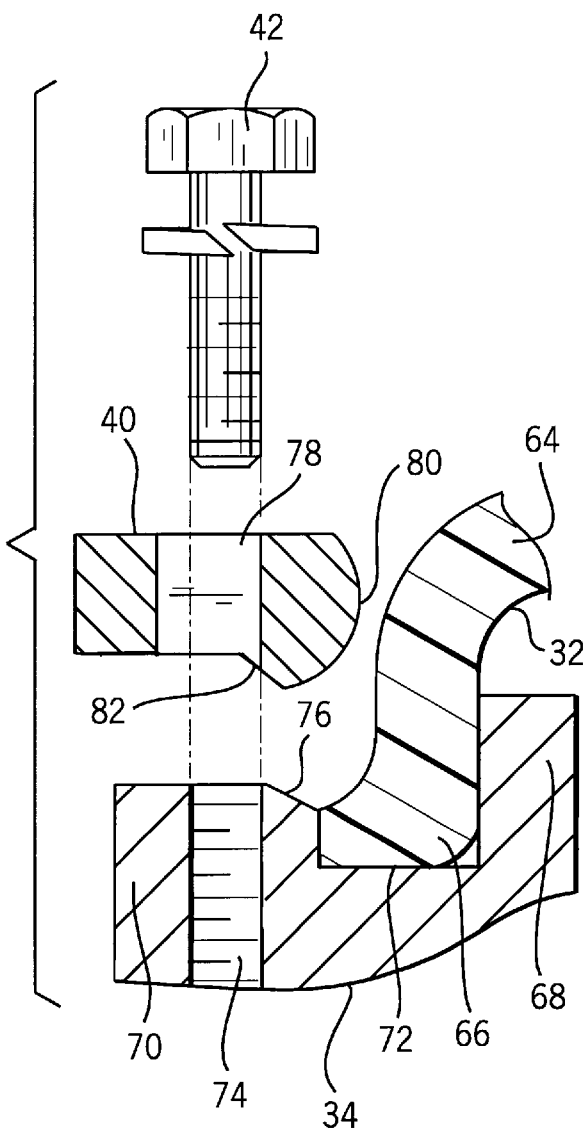
FIG. 7 is an exploded detail view of the components illustrated in FIG. 5 prior to assembly.

FIGS. 7 and 8 illustrate steps for installation of anchoring members 40 and progressive compression of coupling element 32 in hubs 34 and 36. Thus, as illustrated in FIG. 7, for installation on each side of coupling element 32, bead 66 is first placed within annular groove 72 of each hub (hub 34 shown in FIGS. 7 and 8). Subsequently, anchoring members 40 are placed over rear flange 70 and fasteners 42 are loosely secured within threaded apertures 74. Once all anchoring members 40 have been loosely placed about the hub, fasteners 42 are tightened to bring compression ridge 80 of each anchoring member into contact with bead 66 of coupling element 32. As each anchoring member 40 is tightened about rear flange 70, riding surface 82 is brought into contact with inclined guide surface 76 of the hub. Fasteners 42 are further tightened to cause anchoring members 40 to be drawn radially inwardly as indicated by arrow A in FIG. 8, while being forced in axial translation by the interaction of riding surface 82 with inclined guide surface 76, as indicated by arrow B in FIG. 8. As each anchoring member 40 is thus moved into engagement about coupling element 32, slotted apertures 78 permit relative movement of the anchoring members with respect to fasteners 42. Once completely secured to their respective hubs, anchoring members 40 seat against rear flange 70, compressing bead 66 of coupling element 32 both radially and axially as shown in FIG. 5.

As will be appreciated by those skilled in the art, several important advantages flow from the preferred embodiment described above. In particular, the provision of hubs 34 and 36 including integrally-formed grooves 72 for receiving coupling element 32 allows coupling element 32 to be easily installed by the simple insertion of beads 66 into grooves 72. Furthermore, because fasteners 42 enter hubs 34 and 36 radially, generally transverse to the axes 28 and 30 of the coupled shafts, they remain freely accessible to service personnel for installation and subsequent servicing of system 10. Moreover, by virtue of the preferred placement of threaded apertures 74 and fasteners 42, hubs 34 and 36 can be formed with larger shaft-receiving bores than was possible in comparable prior art coupling systems. Consequently, smaller or more compact hubs 34 and 36 can be provided for given power ratings of coupling system 10 as compared to heretofore known systems. It should also be noted that in the preferred embodiments described herein movement of anchoring members 40 both axially and radially during assembly of coupling system 10 offers the advantage of compressing coupling element 32 in both axial and radial directions. The resulting compound loading provides a normal force at points of contact between anchoring members 40, hubs 34 and 36, and coupling element 32 which, combined with a high coefficient of friction between these elements, produces high retaining forces on either side of coupling element 32. These retaining forces allow the coupling system to withstand relatively high torsional loading as may be encountered in certain applications.

As will be appreciated by those skilled in the art, various modifications of the preferred embodiment described above may be envisioned, particularly relating to the form of anchoring members 40 and to the interface between anchoring members 40 and hubs 34 and 36. For example, while in the preferred embodiment described above four anchoring members are provided for covering substantially the entire periphery of each hub, more or fewer anchoring members may be employed where sufficient retaining forces can be developed between the anchoring members and the hubs. Where the anchoring members are made of a sufficiently resilient material, all retaining forces may be exerted by a single member as illustrated in FIG. 9. As shown in FIG. 9, a single anchoring member, designated generally by reference numeral 100, forms an annular ring interrupted by a transverse slot 102. Additional slots 104 may be formed radially about member 100 and extend partially therethrough. Slotted apertures 78 are provided at radial locations around member 100 as described above with respect to anchoring members 40. In addition, anchoring member 100 may include a riding surface 82 and compression ridge 80 of the type described above with respect to anchoring members 40. Slots 102 and 104 enable anchoring member 100 to draw radially inwardly slightly during installation to exert both radial and axial forces on coupling element 32 as described above.

Figure 10:
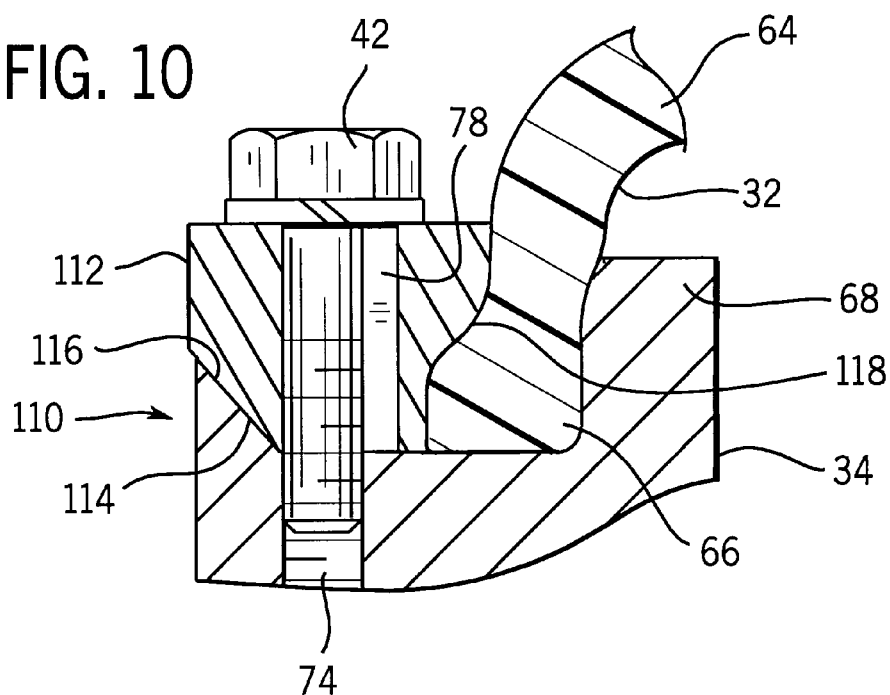
FIG. 10 is a sectional detail view of an alternative configuration of the coupling system illustrated in FIGS. 1 through 4.

FIG. 10 illustrates a further alternative embodiment 110 wherein an anchoring member 112 is configured to cooperate with a guide surface 114 provided toward a rear end of hub 34. In this embodiment, anchoring member 112 includes a rear inclined riding surface 116 which contacts and cooperates with guide surface 114 to translate anchoring member 112 both axially and radially during installation. Slotted apertures 78 are formed through anchoring member 112 to allow for such translation as described above with respect to installation of anchoring members 40. Moreover, as shown in FIG. 10, anchoring members 112 may include a profiled front surface 118 configured to exert desired levels of compressive forces against bead 66 of coupling member 32, which differ or establish a compression gradient along bead 66. It should be noted that profiled front surface 118 may be configured to exert identical forces on bead 66 around the entire circumference thereof, or may be undulated in a radial direction so as to create regions of higher and lower compressive forces.

Figure 11:
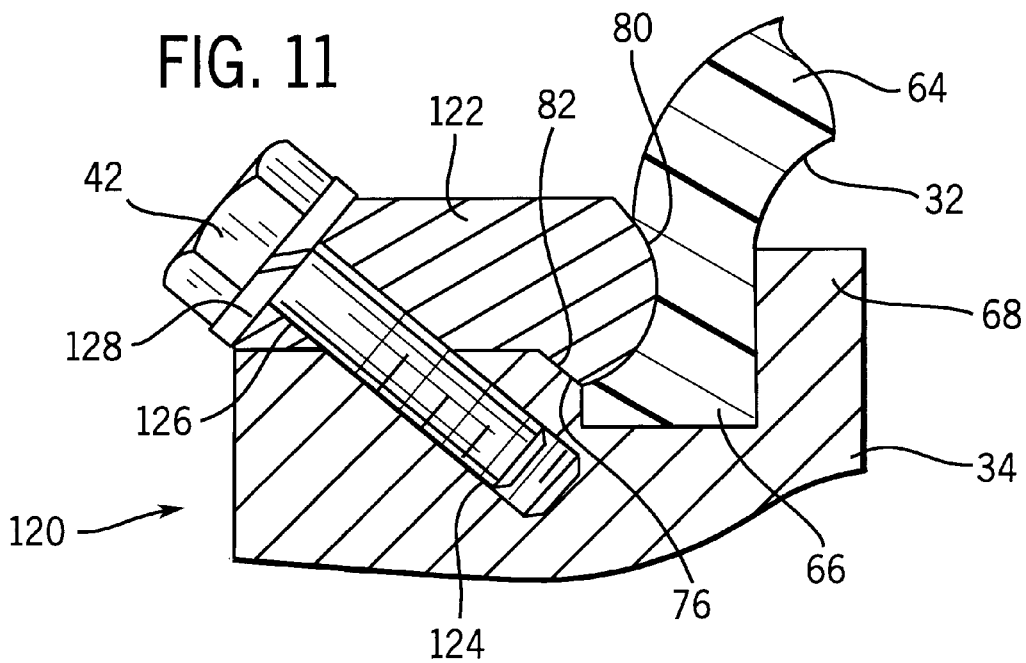
FIG. 11 is a sectional detail view of a further alternative arrangement of the coupling system.

As mentioned above, fasteners 42 used to secure anchoring members about coupling member 32 in the present system are preferably received in the hubs in directions generally transverse to the axes of the aligned shafts, thereby affording ready access to the fasteners for installation and servicing of the coupling system. While in the preferred embodiment described above, these fasteners are oriented generally perpendicular to the axes of the aligned shafts, alternative configurations may be envisioned in which fasteners are received at various angles with respect to the shaft axes. FIG. 11 represents one such alternative embodiment, designated generally by the reference numeral 120, in which anchoring members 122 are secured to hub 34 by fasteners 42 received in inclined threaded apertures 124. Correspondingly inclined apertures 126 are formed in anchoring members 122 for permitting passage of fasteners 42 therethrough. Fasteners 42 bear against an angled rear surface 82 formed on anchoring members 122 to securely hold anchoring members 122 seated against hub 34. As described above with respect to anchoring members 40, anchoring members 122 include a riding surface 82 which bears against an inclined guide surface 76 of hub 34. A forward compression ridge 80 is formed on anchoring members 122 to contact and compress bead 66 of coupling member 32 during installation.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A system for securing first and second generally axially-aligned shafts drivingly to one another, the system comprising:

a first hub having a central axis and configured for mounting on the first shaft, the first hub having a plurality of bores extending generally radially transverse to the central axis thereof;

a second hub having a central axis and configured for mounting on the second shaft, the second hub having a plurality of bores extending generally radially transverse to the central axis thereof;

a flexible coupling element having first and second sides;

a first anchoring assembly, the first anchoring assembly including at least one first anchoring element and a plurality of fasteners, the fasteners being received in the bores of the first hub to secure the first anchoring element to the first hub and to compressively secure the first side of the coupling element to the first hub; and a second anchoring assembly, the second anchoring assembly including at least one second anchoring element and a plurality of fasteners, the fasteners being received in the bores of the second hub to secure the second anchoring element to the second hub and to compressively secure the second side of the coupling element to the second hub.

2. The system of claim 1, wherein the bores of the first hub extend substantially perpendicular to the central axis thereof.

3. The system of claim 1, wherein the first anchoring assembly includes a plurality of arcuate elements, each first anchoring element being configured to partially circumscribe the first hub.

4. The system of claim 1, wherein the coupling element includes first and second enlarged regions on the first and second sides thereof, respectively, and wherein the first enlarged region is received between the first hub and the first anchoring element, and wherein the second enlarged region is received between the second hub and the second anchoring element.

5. The system of claim 4, wherein the first and second hubs include first and second annular grooves, respectively, and wherein the first enlarged region of the coupling element is at least partially received within the first annular groove, and the second enlarged region of the coupling element is at least partially received with the second annular groove.

6. The system of claim 4, wherein the coupling element is a single piece substantially annular elastomeric component, and wherein the first and second enlarged regions comprise beads extending around radially inner peripheral edges of the coupling element.

7. The system of claim 1, wherein the first and second anchoring elements each include surfaces configured to compress the first and second sides of the coupling element axially and radially with respect to the central axes of the first and second hubs.

8. A system for coupling first and second axially aligned shafts drivingly to one another, the system comprising:
   a first hub having a first central axis and configured for mounting on the first shaft;
   a second hub having a second central axis and configured for mounting in the second shaft such that the second central axis is disposed generally coaxial with the first central axis;
   a flexible coupling element having first and second sides;
   a first anchoring assembly, the first anchoring assembly including at least one first anchoring element and means for securing the first anchoring element radially to the first hub via radial and axial movement of the first anchoring element to compress the first side of the coupling element axially and radially therebetween; and
   a second anchoring assembly, the second anchoring assembly including at least one second anchoring element and means for securing the second anchoring element radially to the second hub via radial and axial movement of the second anchoring element to compress the second side of the coupling element axially and radially therebetween.

9. The system of claim 8, wherein the first and second hubs include first and second guide surfaces, respectively, and wherein the first and second anchoring elements contact the first and second guide surfaces, respectively, to compress the first and second sides of the coupling element during assembly of the system.

10. The system of claim 8, wherein the means for securing the first and second anchoring elements to the first and second hubs each includes bores formed in the respective hub and fasteners received within the bores.

11. The system of claim 10, wherein the bores in the first and second hubs extend generally transverse to the respective hub central axis.

12. The system of claim 8, wherein the coupling element includes first and second enlarged regions on the first and second sides thereof, respectively, and wherein the first enlarged region is received between the first and a first anchoring element, and the second enlarged region is received between the second hub and the second anchoring element.

13. The system of claim 12, wherein the first and second hubs include first and second annular grooves, respectively, and wherein the first enlarged region of the coupling element is at least partially received within the first annular groove, and the second enlarged region of the coupling element is at least partially received with the second annular groove.

14. The system of claim 8, wherein the first anchoring assembly includes a plurality of arcuate first anchoring elements, each first anchoring element being configured to partially circumscribe the first hub.

15. An assembly for securing a generally annular flexible coupling element to a shaft, the coupling element including an enlarged region formed along an inner peripheral edge thereof, the assembly comprising:
   a hub having a central axis and configured for mounting on the shaft, the hub including a peripheral recess for receiving the enlarged region of the coupling element and a plurality of radial bores;
   at least one anchoring element configured to interface with the hub for retaining the enlarged region of the coupling element within the recess; and
   a plurality of fasteners received in the radial bores for securing the at least one anchoring element to the hub.

16. The assembly of claim 15, wherein the at least one anchoring element includes a plurality of arcuate elements configured to partially circumscribe the hub.

17. The assembly of claim 15, wherein the the bores extend generally transverse to the central axis.

18. The assembly of claim 15, wherein the enlarged region of the coupling element is a bead extending substantially around the entire inner peripheral edge thereof, and wherein the at least one anchoring element covers substantially the entire bead.

19. The assembly of claim 18, wherein the hub includes a first guide surface adjacent to the recess, and wherein the at least one anchoring element includes a second guide surface configured to contact the first guide surface to progressively compress the coupling element as the at least one anchoring element is secured to the hub.

20. The assembly of claim 15, wherein the peripheral recess of the hub is an annular groove bounded by an annular front flange and an annular rear flange of the hub.

21. A securement assembly for a flexible coupling system, the coupling system including a flexible annular element for drivingly coupling two generally axially aligned transmission elements to one another, the securement assembly comprising:
   a base member supportable on one of the transmission elements, the base member including a plurality of radially extending bores and a first interface surface for contacting a portion of the flexible annular element;
   at least one securement member positionable radially about the base member, the at least one securement member including a second interface surface for contacting a portion of the flexible annular element; and
   a plurality of fasteners engageable in respective radially extending bores for securing the at least one securement member to the base member.

22. The securement assembly of claim 21, wherein including a purality of securement members secureable about a radial outer preiphery of the base member.

23. The securement assembly of claim 22, wherein each securement member is an arcuate element circumscribing a region of the base member.

24. The securement assembly of claim 21, wherein the radially extending bores are disposed generally perpendicularly with respect to a central axis of the base member.

25. The securement assembly of claim 21, wherein the base member includes a guide surface for urging radial and axial displacement of the securement member when the securement member is assembled thereon.

26. The securement assembly of claim 21, wherein the base member forms a hub securable to a transmission shaft, and wherein the first interface surface includes an annular seat formed on the hub for receiving and contacting a portion of the flexible annular element.

* * * * *